May 22, 1962  G. A. KLADDE  3,036,225
SHIFTABLE RANGE MARK GENERATOR FOR RADARSCOPE
Filed Dec. 23, 1958
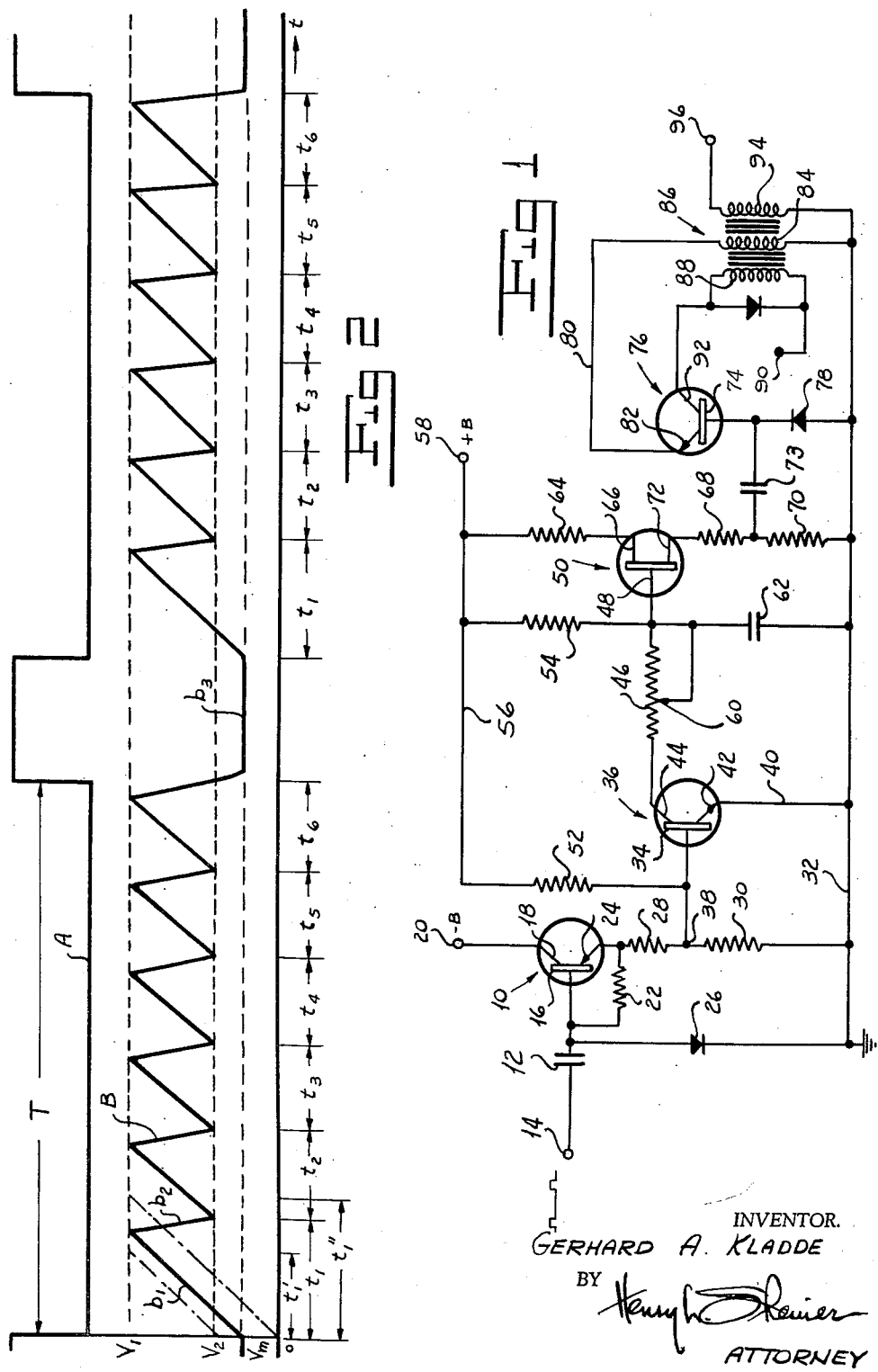
INVENTOR.
GERHARD A. KLADDE
BY
ATTORNEY United States Patent Office 3,036,225
Patented May 22, 1962

3,036,225
SHIFTABLE RANGE MARK GENERATOR
FOR RADARSCOPE
Gerhard A. Kladde, Portchester, N.Y., assignor to United
Aircraft Corporation, East Hartford, Conn., a corporation of Delaware
Filed Dec. 23, 1958, Ser. No. 782,476
6 Claims. (Cl. 307—88.5)

My invention relates to a shiftable range mark generator for a radarscope and more particularly to an improved range mark generator which overcomes the disadvantages of range mark generators of the prior art.

In radar systems of the prior art the instant at which the magnetron fires generally is considered to be "zero" time with reference to which range measurements are made. These systems of the prior art are provided with range mark generating circuits, usually responsive to the firing of the magnetron, for producing a number of equally spaced pulses with reference to the zero time for indicating the distance from the radar installation to an object being observed. In these prior art circuits, such for example as the conventional Hartly range mark generator, there exists an inherent delay which causes the initial range mark to be displaced somewhat from zero time. This displacement introduces an error into the range indicated by the marks following the initial mark. This range marker circuit delay is especially evident in modern transistorized radar circuits with the result that large inaccuracies are introduced into the range indications provided by these circuits.

It may be desirable in a particular case to consider some time other than the firing time of the magnetron as the reference or zero time from which range is to be measured. Circuits are known in the prior art for varying the time of occurrence of the initial pulse of a train of pulses with the result that the reference time may be varied somewhat. In accomplishing this result, however, the circuits of the prior art at the same time vary the spacing between adjacent ones of the succeeding pulses of a train with the result that the range steps between marks are varied in an undesirable manner.

I have invented a shiftable range mark generator for a radarscope which overcomes the disadvantages of range mark generators of the prior art pointed out hereinabove. My generator provides a series of range-marking pulses which may be shifted with respect to zero time to adjust the positions of the pulses accurately with respect to a starting time such as the instant at which a magnetron fires. I accomplish this result without changing the interpulse spacing of the succeeding pulses of a train of range-marking pulses. My system permits a train of pulses to be adjusted to any arbitrarily selected reference or zero time.

One object of my invention is to provide a shiftable range mark generator for a radarscope which overcomes the disadvantages of range mark generators of the prior art.

Another object of my invention is to provide a range mark generator for a radarscope which provides a series of range mark pulses which may be shifted with respect to the reference time to adjust the positions of the pulses accurately with respect to that time.

A further object of my invention is to provide a shiftable range mark generator for a radarscope in which the starting time of a train of pulses may be accurately adjusted without changing the interpulse spacing of the succeeding pulses of the train.

A still further object of my invention is to provide a shiftable range mark generator which permits the train of range mark pulses to be accurately adjusted with respect to any arbitrarily selected reference point.

Other and further objects of my invention will appear from the following description:

In general my invention contemplates the provision of a shiftable range mark generator for a radarscope including a double base diode and an energy-storing device for applying a potential to the control element of the diode. A network including a normally conducting switching element and a variable impedance normally maintains the energy-storing device at a potential which is less than the critical firing potential of the diode. I provide means for opening the normally conducting switching element over the period of time during which it is desired to generate range marks to remove the variable impedance from the network. The energy-storing device builds up a potential until the diode fires to discharge the storage device rapidly until the control element potential falls below the extinction potential of the diode. This operation continues until the switching element is again rendered conductive to hold the storage device potential at a point below the critical firing potential of the diode. Each time the diode fires a range-marking pulse is produced in the diode output circuit. By changing the value of the variable impedance to change the initial potential on the storage element, I vary the time of the first range-marking pulse with respect to the time at which the switching element opens without affecting the interpulse time of succeeding pulses produced by the diode over the period of time during which the switching device is nonconductive.

In the accompanying drawings which form part of the instant specification and which are to be read in conjunction therewith and in which like reference numerals are used to indicate like parts in the various views:

FIGURE 1 is a schematic view of one form of my shiftable range mark generator for a radarscope.

FIGURE 2 is a plot showing certain of the wave forms generated in my shiftable range mark generator for a radarscope.

Referring more particularly to FIGURE 1 of the drawings, my shiftable range mark generator includes a p-n-p transistor indicated generally by the reference character 10 connected to operate as an emitter-follower. A coupling capacitor 12 connected between an input terminal 14 and the base 16 of transistor 10 applies a series of respective negative-going square pulses to the base 10. As will be explained hereinafter these negative pulses represent the respective periods of time during which range-marking pulses are produced.

I connect the collector 18 of transistor 10 to a terminal 20 of a suitable source of negative potential. A resistor 22 connected between the base 16 and the emitter 24 of the transistor 10 provides a base-emitter bias for the transistor. A diode 26 clamps the base 16 to ground. A voltage divider made up of resistors 28 and 30 connected between emitter 24 and a ground conductor 32 provide the emitter-follower circuit output.

As is known in the art in an emitter-follower circuit of the type described hereinabove, an input wave form applied to the terminal 14 produces an output wave form across the resistor 30 having a form similar to that of the input wave form.

I connect the base 34 of a switching transistor indicated generally by the reference character 36 to the common terminal 38 of resistors 28 and 30. A conductor 40 connects the emitter 42 of transistor 36 to ground conductor 32. I connect the collector 44 of transistor 36 to one terminal of a potentiometer resistance winding 46, the other terminal of which is connected to the control element 48 of a double-base diode indicated generally by the reference character 50. Respective resistors 52 and 54 connect base 34 and the control element 48 to a conductor 56 connected to the terminal 58 of a suitable source of positive potential. A brush 60 associated with the potentiometer resistance winding 46 is connected to element 48. The position of this brush may be adjusted in a manner known to the art to short out a predetermined portion of the resistance winding 46. I connect an energy-storing device such as a capacitor 62 between control element 48 and conductor 32. A resistor 64 connects a first base element 66 of the double base diode 50 to the conductor 56. A pair of series-connected resistors 68 and 70, forming a voltage divider, connect the second base element 72 of the diode 50 to the conductor 32. As will be explained hereinafter, over the interval during which the switching transistor 36 is cut off the diode 50 produces a series of sharp positive pulses across the voltage-dividing-resistor 70.

I couple the wave form appearing at the common terminals of resistors 68 and 70 through a capacitor 73 to the base 74 of a transistor indicated generally by the reference character 76 connected in a blocking oscillator circuit. A diode 78 connected bewteen the base 74 and conductor 32 clamps the base to ground potential. A conductor 80 connects the emitter 82 of transistor 76 to one winding 84 of a transformer indicated generally by the reference character 86. I connect the other terminal of winding 84 to the ground conductor 32. The transformer 86 includes a feedback winding 88 connected between a terminal 90 of a source of positive biasing potential and the collector 92 of transistor 76. An output winding 94 of transformer 86 connected between conductor 32 and a terminal 96 applies the output wave form, which is the series of sharp range-marking pulses, to the terminal 96.

Referring now to FIGURE 2 of the drawings, the wave form A represents the input to the terminal 14 of my range mark generator. Range marks are to be produced over the period of time T representing the duration of the negative-going pulses of the wave form A.

The operation of my shiftable range mark generator can best be understood by assuming that the positive-going portion of the wave A is being applied to the input terminal 14. This portion of the wave is amplified by the emitter-follower 10 and is applied to the base 34 of switching transistor 36 to render this transistor conductive. With this transistor conducting the capacitor 62 charges to a potential determined by the resistance network including resistors 54 and 46 and the forward resistance of the transistor 36. If the potential at terminal 58 is $E_b$ and if the resistances of the respective resistors 54 and 46 and of the transistor 36 are $R_1$, $R_0$, and $R_t$, then the potential $V_m$ on capacitor 62 may be expressed as:

$$(1) \qquad V_m = \frac{R_t + R_0}{R_t + R_0 + R_1} E_b$$

I so select my resistance values that this initial potential $V_m$ on capacitor 62 is less than the critical firing potential $V_1$ of the double base diode 50.

Let us next assume that the negative-going portion of the wave form A is being applied to the input terminal 14. When this occurs the negative potential applied to the base 34 of switching transistor 36 cuts off the transistor with the result that resistor 46 drops out of the charging circuit of capacitor 62. At this time capacitor 62 is no longer held at the voltage $V_m$ but begins to charge toward the potential $E_b$ at a rate determined by resistor 54 and by the capacitance value of capacitor 62. I have indicated this charging of capacitor 62 by the portion $b_1$ of the wave form B in FIGURE 2. When the potential on capacitor 62 reaches the critical firing potential $V_1$ of the double base diode 50, the diode conducts and the capacitor discharges rapidly through the diode and through the resistors 68 and 70 which have a much smaller value than does resistor 64. I have indicated this portion of the wave form B as $b_2$ in FIGURE 2.

As the capacitor 62 discharges in this manner it reaches a potential $V_2$ which is the extinction potential of the diode 50. During the rapid discharge of the capacitor 62 through the diode a spike of voltage is produced across resistor 70.

As long as the switching transistor 36 remains cut off the capacitor 62 again begins its climb toward $E_b$ until it again reaches the firing potential $V_1$. This alternate charging and discharging of capacitor 62 to produce spikes of voltage across resistor 70 is repeated as long as the switching transistor 36 remains cut off. The blocking oscillator including transistor 76 sharpens these spikes of voltage to provide a series of range-marking pulses at the terminal 96.

At the end of the negative-going portion of the wave form A, transistor 36 is again rendered conductive and the potential of capacitor 62 returns to the value $V_m$ which, as is explained hereinabove, is below the critical firing potential of diode 50. This portion of the wave form B is indicated by $b_3$ in FIGURE 2. When the negative-going portion of the wave form A again enters the terminal 14 capacitor 62 begins its climb from the potential $V_m$ toward $E_b$ to start a new series of range-marking pulses. Since the potential $V_m$ from which the capacitor charges at zero time is less than the extinction potential $V_2$ from which capacitor 62 charges for subsequent range-marking pulses, the time required for the capacitor to reach the firing potential $V_1$ to produce the initial pulse of a series is greater than the time required for the capacitor to reach the firing potential to produce subsequent range-marking pulses. It is to be noted that my circuit produces no pulse marking the beginning of the operation of the range-marking circuit. That is, the first pulse produced in my arrangement is that pulse which marks the first range from zero time.

Let us next assume that the brush 60 is moved along the winding 46 to vary the potential $V_m$ from which the capacitor 62 begins to charge from zero time to provide the initial pulse. If this is increased to increase $R_0$, $V_m$ likewise increases and the time between zero time and the first firing of the double base diode 76, decreases to the time $t_1'$. If $R_0$ is decreased, $V_m$ decreases and the time of the first pulse increases to $t_1''$. It will thus be seen that the time between zero time and the initial pulse may readily be varied by moving brush 60 along resistor 46 to change the value of $V_m$ and thus vary $t_1$.

The result outlined above is accomplished without changing the interpulse time, indicated in FIGURE 2 as $t_2$, $t_3$, and so forth, between pulses following the first pulse. This is readily apparent since the interpulse time of a pair of pulses is determined solely by the critical firing potential $V_1$ and the extinction potential $V_2$ of the double diode 50.

It will be seen that I have accomplished the objects of my invention. I have provided a shiftable range mark generator for a radarscope which produces a series of range-marking pulses the position of the first pulse of which may be varied with respect to zero time. My system accomplishes this result without changing the interpulse spacing of pulses following the initial pulse. My system thus overcomes the disadvantages of range mark generators of the prior art. It permits the train of range-marking pulses to be adjusted to any desired reference point.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A range mark generator for producing a train of pulses over an interval including in combination an electron device having a control element, said electron device being rendered conductive in response to the presence at its control terminal of a potential of a first magnitude and being extinguished in response to the presence at its control terminal of a potential of a second magnitude less than said first magnitude, an energy storage device, a source of potential, a circuit including said storage device and said source of potential for normally charging said energy storage device to an initial potential of a magnitude less than said second magnitude, means for modifying said circuit at the beginning of said interval to permit said energy storage device to charge from said initial potential toward the potential of said source and means for applying the storage device potential to said control element to cause said electron device to generate a train of pulses the first pulse of which has a certain duration determined by said initial potential and said first magnitude potential and the succeeding pulses intermediate the first and last pulses of the train having a duration determined by said first and second magnitude potentials which is less than said certain duration.

2. A range mark generator for producing a train of pulses over an interval including in combination an electron device having a control element, said electron device being rendered conductive in response to the presence at its control terminal of a potential of a first magnitude and being extinguished in response to the presence at its control terminal of a potential of a second magnitude less than said first magnitude, an energy storage device, a source of potential, a circuit including said storage device and said source of potential for normally charging said energy storage device to an initial potential of a magnitude less than said second magnitude, means for modifying said circuit at the beginning of said interval to permit said energy storage device to charge from said initial potential toward the potential of said source, means for applying the storage device potential to said control element to cause said electron device to generate a train of pulses the first pulse of which has a certain duration determined by said initial potential and said first magnitude potential and the succeeding pulses intermediate the first and last pulses of the train having a duration determined by said first and second magnitude potentials which is less than said certain duration, and means for varying said initial potential whereby to change the duration of the first pulse effectively to shift said train of pulses without changing the duration of said intermediate succeeding pulses of the train.

3. A range mark generator for producing a train of pulses over an interval including in combination an electron device having a control element, said electron device being rendered conductive in response to the presence at its control terminal of a potential of a first magnitude and being extinguished in response to the presence at its control terminal of a potential of a second magnitude less than said first magnitude, an energy storage device, a source of potential, a circuit including said source and said energy storage device for charging said storage device, a variable impedance, normally conducting means connecting said variable impedance across said energy storage device for limiting the charging of said energy storage device to an initial potential of a magnitude less than said second magnitude, means for rendering said normally conducting means nonconductive at the beginning of said interval to permit said energy storage device to charge from said initial potential toward the potential of said source, means for applying the storage device potential to said control element to cause said electron device to generate a train of pulses the first pulse of which has a certain duration determined by said initial potential and said first magnitude potential and the succeeding pulses intermediate the first and second pulses of said train have a duration less than said certain duration and determined by said first and second magnitude potentials and means for adjusting said variable impedance to vary said initial potential whereby to change the duration of said first pulse effectively to shift said train of pulses without changing the duration of the intermediate succeeding pulses.

4. A range mark generator for producing a train of pulses over an interval including in combination a double base diode having a control element, said diode being rendered conductive in response to the presence at its control terminal of a potential of a first magnitude and being extinguished in response to the presence at its control terminal of a potential of a second magnitude less than said first magnitude, a capacitior, a source of potential, a variable impedance, a normally conducting switching transistor, a charging circuit including said source and said capacitor and including said variable impedance and said transistor connected in parallel across said capacitor for normally charging said capacitor to an initial potential of a magnitude less than said certain magnitude, means for rendering said normally conducting transistor nonconductive at the beginning of said interval to permit said capacitor to charge from said initial potential toward the potential of said source, means for applying the capacitor potential to the control element to cause said double base diode to generate a train of pulses the first pulse of which has a certain duration determined by said initial potential and said first magnitude potential and the succeeding pulses intermediate the first and second pulses of the train have a duration determined by said first and second magnitude potentials and means for adjusting said variable impedance to vary said initial potential to change the duration of said first pulse effectively to shift said train of pulses without changing the duration of intermediate succeeding pulses.

5. A range mark generator as in claim 4 in which said switching transistor assumes its normally conducting state at the end of said interval.

6. A range mark generator as in claim 4 including a pulse sharpening circuit connected to said double-base diode.

References Cited in the file of this patent

UNITED STATES PATENTS

| | | |
|---|---|---|
| 2,826,696 | Suran | Mar. 11, 1958 |
| 2,845,548 | Sillman et al. | July 29, 1958 |
| 2,847,632 | Harvey et al. | Aug. 12, 1958 |
| 2,892,101 | Bright | June 23, 1959 |
| 2,898,557 | Dahlin | Aug. 4, 1959 |
| 2,902,655 | Jones et al. | Sept. 1, 1959 |
| 2,905,835 | Wray | Sept. 22, 1959 |

OTHER REFERENCES

"Transistor Manual," 2nd ed. 1957, General Electric.